April 15, 1958 W. G. MORRISON ET AL 2,831,038
APPARATUS AND PROCESS FOR SOLVENT EXTRACTION
Filed Oct. 11, 1955 2 Sheets-Sheet 1
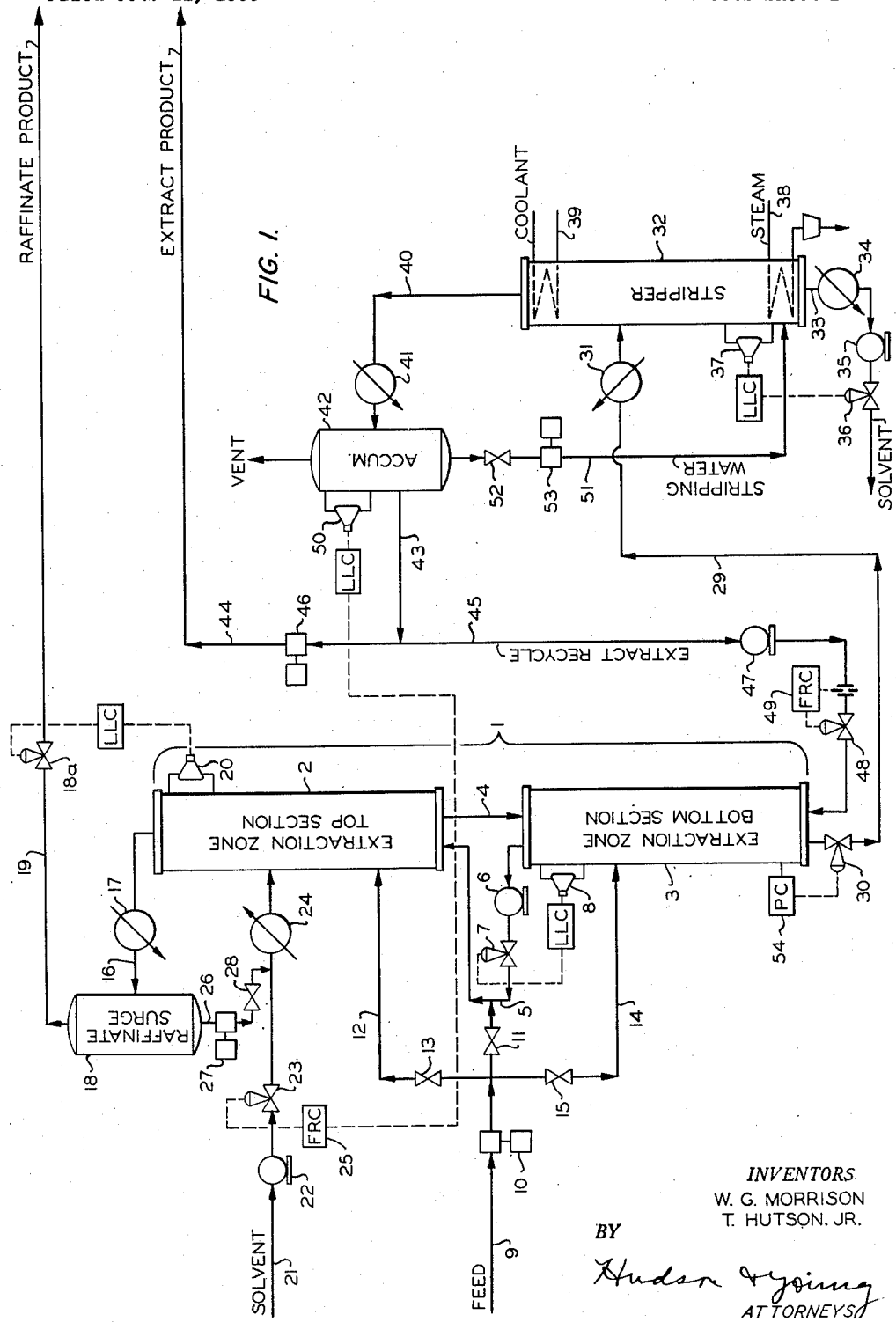
INVENTORS
W. G. MORRISON
T. HUTSON, JR.
BY
Hudson & Young
ATTORNEYS

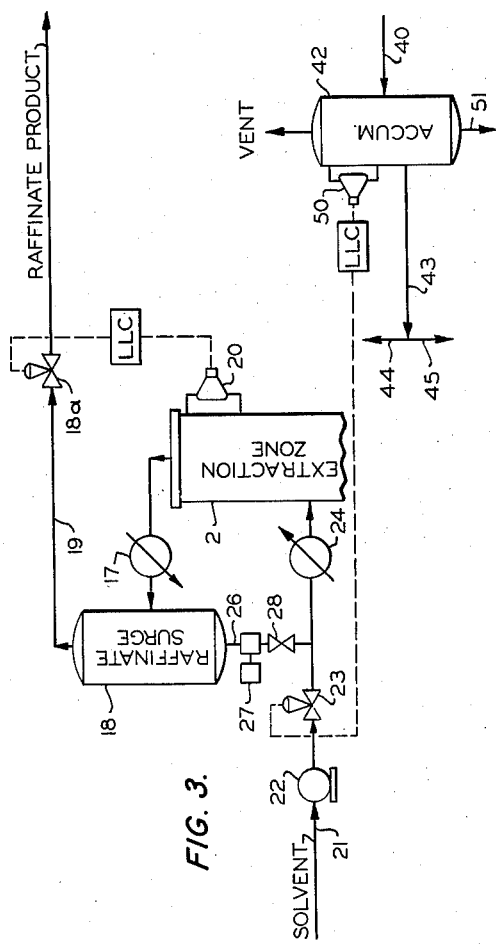

# United States Patent Office 2,831,038
Patented Apr. 15, 1958

2,831,038

APPARATUS AND PROCESS FOR SOLVENT EXTRACTION

William G. Morrison and Thomas Hutson, Jr., Phillips, Tex., assignors to Phillips Petroleum Company, a corporation of Delaware Application October 11, 1955, Serial No. 539,850

16 Claims. (Cl. 260—666)

This invention relates to a process and arrangement of apparatus for effecting solvent extraction of liquid mixtures and separation of the same into components. In one aspect, the invention relates to a method and apparatus for controlling a solvent extraction process.

The separation of liquid mixtures of organic materials and particularly hydrocarbon compounds into two or more fractions of different characteristics by solvent extraction and recovery of the separated compounds from the extract and raffinate phases has long been practiced. As applied to hydrocarbons, the selective solvent utilized usually has a greater affinity for more cyclic and/or unsaturated hydrocarbons in a series of hydrocarbons of similar molecular weight. In conventional solvent extraction processes, one of the chief problems is control of the process so as to effect a uniform separation or the production of a product stream of uniform purity or high concentration of the desired component or components of the extract and/or raffinate streams. Due to process variables difficult precisely to control, including feed composition, temperatures in the various contacting zones, pressure conditions within the system, composition of the solvent employed, etc., constant results with smooth operation are difficult to obtain.

One of the principal objects of the invention is to provide a process and arrangement of apparatus for the efficient separation of the components of a liquid mixture, utilizing a selective solvent for one or more of the components. Another object is to provide a process and apparatus for effecting liquid-liquid extraction of a liquid mixture with accurate and close control of the flow of streams to and from the extraction zone or column. A further object of the invention is to provide a process and arrangement of apparatus for separating a hydrocarbon mixture into selected hydrocarbon fractions by liquid-liquid extraction with a selective solvent whereby accurate and close control of the character of the selected hydrocarbon fraction is afforded in spite of significant, though small, variations in process variables which normally tend to upset smooth operation of such an extraction process. Other objects and aspects, as well as advantages, of the invention will be apparent from a consideration of the accompanying disclosure, drawings, and claims.

The invention is applicable to the conventional solvent extraction processes of the prior art and comprises arrangement of apparatus with controls and a method of operation for controlling a solvent extraction process so as to maintain substantially uniform purity of the products of the extraction process.

In accordance with the invention, the flow of extract product and extract recycle streams are maintained at a constant rate of flow for accurate control of the separation, while the solvent feed rate to the extraction zone is controlled either directly or indirectly, in response to the rate of production or flow of extract. In accordance with one aspect of the invention, this control is effected by making the flow control valve in the solvent feed line directly responsive to the rate of flow of extract from the solvent-extract separation means, such as by installing a flow recorder controller in said extract stream, which controller controls the valve in the solvent feed line. According to another aspect of the invention, indirect control of the solvent feed rate in response to the rate of extract production or flow is effected by making the solvent feed rate directly responsive to the liquid level in an extract accumulator zone. In accordance with another aspect of the invention, the flow of extract product and extract recycle streams and feed to the extraction zone are maintained at a constant rate of flow, while the solvent feed rate to the extraction zone is also maintained by a rate of flow controller which is reset by a liquid level controller which is responsive to the liquid level of the extract accumulator that accumulates the liquid extract stream from the extract phase stripper or other extract-solvent separation means.

Very accurate control of the ratio of extract recycled to extract product, herein termed "extract reflux ratio," is necessary in many separations to maintain high and substantially constant purity products. Accordingly, this ratio is maintained constant by positive metering or flow control of the two extract streams involved. However, in order to compensate for minor changes in plant operation such as small changes in the solvent feed composition, ambient temperatures, or in the composition of the feed to be extracted, the method of control and arrangement of apparatus of the invention is provided to make it possible to obtain a constant amount of total extract in the extract phase from the extraction zone and, thus, possible to maintain both the extract recycle and the extract product on constant rate of flow. Thus, for instance, if the solvent feed composition changes slightly so that it has somewhat less solvent power for the portion of the feed desired to be extracted, the operation of the arrangement of controls of the invention will automatically increase the solvent feed rate, thus maintaining the desired constant amount of extract emerging from the extraction zone in the solvent extract phase per unit of time. In a now preferred embodiment of the invention, the raffinate product flow is maintained by a liquid level control which controls the interface level between solvent and raffinate phases in the extraction zone. In a now preferred embodiment, a portion of the raffinate product is recycled to the raffinate end of the extraction zone, usually by dissolving it in the solvent feed. When raffinate recycle is employed, it is preferably introduced at a constant rate of flow.

In one embodiment of the invention, the extraction zone is divided into two or more sections which are operated in series, the intermediate extract phase taken from the bottom of the first section being passed to the upper portion of the second section, and the intermediate raffinate taken from the top of the second section being introduced to the lower portion of the first section and so on with any number of sections.

In accordance with the invention, there is provided a process which comprises passing a feed stream including a plurality of liquid components into an intermediate portion of a solvent extraction zone; passing a stream comprising a selective solvent for at least one of the components of the feed into an upper portion of the extraction zones so as to effect comingling of the feed and solvent and extraction of at least one of the feed components to form a solvent-extract phase and a raffinate phase and establish an interface between the phases in upper portion of the extraction zone; recovering a raffinate stream from the uppermost portion of the extraction zone; recovering a solvent-extract stream from a lower-most portion of the extraction zone; separating the solvent-extract stream into a solvent effluent stream and a concentrated extract stream; controlling the operation of the extraction zone and the concentration of the desired component or components in the concentrated extract stream by the steps comprising: separating the concentrated extract stream into an extract product stream and an extract stream which is recycled to the lowermost portion of the extraction zone, and maintaining a substantially constant rate of flow of each of these two streams; maintaining a substantially constant rate of flow of said feed stream; and controlling the rate of flow of said stream comprising a selective solvent passed to said extraction zone in response to the rate of production of said concentrated extract stream.

Further in accordance with the invention, there is provided a process which comprises passing a feed stream including a plurality of liquid components into an intermediate portion of a liquid-liquid solvent extraction zone; passing a stream comprising a selective solvent for at least one of the components of the feed into an upper portion of the extraction zone so as to effect comingling of the feed and solvent and extraction of at least one of the feed components to form a solvent-extract phase and a raffinate phase and establish an interface between the phases in the extraction zone; recovering a raffinate stream from the uppermost portion of the extraction zone; recovering a solvent extract stream from the lowermost portion of the extraction zone; separating solvent-extract stream into a solvent effluent stream and a concentrated extract stream; collecting the concentrated extract in an accumulation zone; and controlling the operation of the extraction zone and the concentration of the desired component or components of the concentrated extract stream by the steps comprising: separating the concentrated extract stream from the accumulation zone into an extract product stream and an extract stream which is recycled to the lowermost portion of the extraction zone, and maintaining a substantially constant rate of flow of each of these two streams; maintaining a substantially constant rate of flow of said feed stream; and directly controlling the rate of flow of said stream comprising a selective solvent passed to said extraction zone in response to the liquid level in said accumulation zone, said level being dependent upon the rate of flow of said concentrated extract stream.

In accordance with another, now preferred aspect of the invention, there is provided a process which comprises passing a feed stream including a plurality of liquid components into an intermediate portion of a liquid-liquid extraction zone; passing a stream comprising a selective solvent for at least one of the components of the feed into an upper portion of the extraction zone so as to effect commingling of the feed and solvent and extraction of at least one of the feed components to form a solvent-extract phase and a raffinate phase and establish an interface between the phases in the extraction zone; recovering a raffinate stream from the uppermost portion of the extraction zone; recovering a solvent-extract stream from the lowermost portion of the extraction zone; separating the solvent-extract stream into a solvent effluent stream and a concentrated extract stream; collecting the concentrated extract in an accumulation zone; and controlling the operation of the extraction zone and the concentration of the desired component or components in the concentrated extract stream by the steps comprising: separating the concentrated extract stream from the accumulation zone into an extract product stream and an extract stream which is recycled to the lowermost portion of the extraction zone, and maintaining a substantially constant rate of flow of each of these two streams; maintaing a substantially constant rate of flow of said feed stream; maintaining the solvent passed to the said upper portion of the extraction zone upon rate of flow control, which rate of flow control is reset in response to change in liquid level in said accumulation zone, said liquid level being responsive to the rate of flow of said concentrated extract stream.

In a now preferred embodiment, the process also comprises withdrawing from the extraction zone the raffinate stream at such a rate as to maintain the interface level in the upper portion of the extraction zone substantially constant, and withdrawing the solvent-extract at such a rate as to maintain a predetermined pressure at a point in a lower portion of the extraction zone, such as by utilization of a back pressure valve on the solvent-extract stream responsive to the pressure in a lower portion of the extraction zone. When the invention utilizes an extraction zone having two separate sections connected in series, the back pressure valve and control are applied to the lower or downstream extraction section, and an intermeditae raffinate is withdrawn from the upper portion of the lower section at a rate effective to maintain the interface level in the upper portion of said lower section substantially constant. In a now of preferred embodiment, the invention also comprises returning as recycle to the upper portion of the extraction zone a part of the raffinate at a constant rate of flow.

Illustrative of the processes to which the invention is applicable are the separation of cycloparaffins such as cyclohexane or methylcyclohexane from a mixture of the same with paraffins; separation of aromatics from a mixture with paraffins; separation of aromatics from a mixture with naphthenes and paraffins; and separation of aromatics and naphthenes from a mixture with paraffins. Commonly used selective solvents include methyl Carbitol alone or with added water, furfural, methanol, diethylene glycol, triethylene glycol, acetonitrile, and sulfur dioxide, with or without added water.

In accordance with the invention, there is provided an arrangement of apparatus for effecting and controlling a solvent extraction process, which comprises an extraction column; a feed line leading into an intermediate portion of said column and having means for controlling the rate of flow therein; a solvent feed line leading into an upper portion of said column; a raffinate line leading from the uppermost portion of said column; a solvent-extract line leading from the lowermost portion of the said column; means in said solvent-extract line for separating solvent-extract into a solvent stream in a solvent effluent line and an extract stream in an extract effluent line, said extract effluent line leading into an extract accumulator vessel; an extract line leading from said accumulator vessel and branching into an extract product line and an extract recycle line for passing extract as recycle to a lower portion of said extraction column; means for positive control of the rate of flow in said extract product line at a substantially constant rate; means for positive control of the rate of flow in said extract recycle line at a substantially constant rate; and means for controlling the rate of flow in said solvent feed line in response to the rate of flow in said extract effluent line. In one embodiment control means for making the solvent feed rate depend upon the rate of flow of extract in said extract effluent line comprises a control valve in said solvent feed line responsive to a flow rate controller sensitive to the rate of flow in said extract effluent line. In another embodiment the control means comprises a control valve in said solvent feed line responsive to a liquid level controller operatively connected to said accumulator vessel, said level in said accumulator being dependent upon the rate of flow of extract in said extract effluent line. In another embodiment the control means comprises a control valve in said solvent feed line responsive to a flow rate controller which is reset by a liquid level controller operatively connected with said accumulator vessel, said liquid level being dependent upon the rate of flow of extract in said extract effluent line.

A more complete understanding of the invention may be had from a consideration of the drawings of which Figure 1 illustrates one embodiment of the invention and Figure 2 illustrates another embodiment. Figures 3 and 4 each illustrate another embodiment of the method of solvent feed control. Corresponding numerals are utilized to designate corresponding elements in the four figures.

Referring to Figure 1, the extraction zone 1 consists of upper extraction section 2 and lower extraction section 3. Line 4 connects the bottom of the upper section with a point near the top of the lower section, while line 5, containing pump 6 and valve 7, connects the top of the lower section with a point near the bottom of the upper section. Liquid interface level control means 8 in the upper portion of the lower section is operatively connected with motor valve 7. A feed line 9 containing valve 11 and flow control device 10, such as a metering pump, connects with line 5. Alternate branch feed line 12 containing valve 13 connects with an intermediate portion of the upper section 2 of the extraction zone 1, while alternate feed line 14 containing valve 15 connects with an intermediate portion of the lower section 3 of the extraction zone 1. Line 16 containing cooler 17 connects the top of section 2 with raffinate surge durm 18. Raffinate product line 19 containing control valve 18a extends from the top of drum 18. In the top of section 2 interface level controller 20 is located and is operatively connected with control valve 18a. Solvent feed line 21 containing pump 22, control valve 23 and heat exchange means 24 connects with the upper portion of section 2. Flow rate controller 25 is operatively connected with control valve 23. Line 26 connects the lower portion of durm 18 with line 21 and contains flow control device 27, such as a metering pump, and valve 28. Extract phase withdrawal line 29, containing control valve 30 and heat exchanger 31, extends from the bottom of section 3 and connects with an intermediate portion of stripper 32. Control valve 30 is operatively connected to pressure controller 54, which is responsive to the pressure at a point in the lower extraction zone section 3. Stripped solvent withdrawal line 33 containing cooler 34, pump 35 and control valve 36 extends from the bottom of stripper 32. Liquid level controller 37, responsive to the level in the bottom of stripper 32, is operatively connected with valve 36. Steam coil 38 in the bottom of stripper 32 provides for heating for the stripping operation while cooling coil 39 in the top of the stripper is provided for refluxing the stripper column. Stripper overhead line 40 containing condenser 41 connects the top of stripper 32 with accumulator zone 42. Line 43 extends from an intermediate point in accumulator zone 42 and branches into lines 44 and 45. Extract product line 44 contains flow control device 46 while extract recycle line 45 contains pump 47 and control valve 48 which is operatively connected to flow rate controller 49. Line 45 connects at its other end with the bottom of section 3. Liquid level controller 50 is responsive to the liquid level in accumulator zone 42 and is operatively connected to reset flow rate controller 25. In the apparatus just described many of the conventional flow controllers, such as those controlling cooling water and steam rates, valves, temperature controllers, such as control valves responsive to temperatures at various points in the stripper and in the extraction zone, have not been illustrated or described since these are well known or illustrated in the art. In the operation of the process illustrated in Figure 1 the feed may be introduced through line 9 into line 5, valves 13 and 15 being closed, or it may be introduced through lines 9 and 12 into section 2, valves 11 and 15 being closed and valve 13 being open, or it may be introduced through lines 9 and 14 into section 3, valves 11 and 13 being closed and valve 15 being open. Also, valve 28 is usually open in the operation of the process so that a portion of the raffinate is recycled through lines 26 and 21 to section 2; however, this is not a required feature of operation of the process and, if desired, valve 28 can be closed.

In operation of the process illustrated in Figure 1, a liquid feed containing a plurality of components is introduced through line 9 at a constant rate into line 5, or into section 2 through line 12, or into section 3 through line 14 as previously noted. Lean stripped solvent is introduced through line 21 by pump 22 at a rate controlled by flow rate controller 25 and valve 23, its temperature being adjusted to a desired constant value by heat exchanger 24. Valve 28 being open, a constant flow of raffinate from drum 18 is maintained by metering pump 27, pumping raffinate to be combined with solvent in line 21. Solvent flows down section 2 as a continuous phase contacting the upflowing feed, and extracts components therefrom during its downward flow to the bottom of section 2. Extract continues its flow through line 4 into the upper portion of section 3 and is withdrawn through line 29 at a rate controlled by control valve 30 in response to pressure controller 54. Interface level controller 8 maintains a substantially constant level of extract phase in the top portion of section 3 by controlling valve 7 which controls the rate of withdrawl of intermediate raffinate phase from the top of section 3 into the lower portion of section 2. Raffinate from the top of section 2 flows through line 16 and cooler 17 into drum 18. Flow control valve 18a actuated by interface level controller 20 connected with the upper portion of section 2 provides for withdrawal of raffinate product from drum 18 at a rate which maintains a substantially constant interface level between the solvent phase and the raffinate phase in section 2 of extraction zone 1. The solvent-extract phase flowing through line 29 is adjusted to a desired temperature by heat exchanger 31 and introduced at an intermediate point into stripper 32. From stripper 32 concentrated extract flows through line 40 and condenser 41 into accumulator zone 42 and stripped solvent flows from the bottom of the stripper from line 33 to a solvent surge tank (not shown) from whence it flows to solvent feed line 21. The concentrated extract in zone 42 flows therefrom through line 43, a constant flow being taken as extract product through line 44 while another constant flow, the remaining portion of the concentrated extract, is pumped at a constant rate through line 45 into the bottom of the lower section 3 of the extraction zone. The ratio of the quantity of concentrated extract flowing through line 45 to the amount of concentrated extract flowing through line 44 is termed the "extract reflux ratio" and its control is a very important factor in maintaining a high and substantially constant purity product from the extraction process. Maintaining this reflux ratio by positive metering of each of the streams is, of course, the best and most accurate method. However, in order to compensate for slight changes in the system, such as a small change in the solvent composition, there must be some flexibility in the system. This flexibility is provided by automatically resetting the flow rate controller which controls the solvent feed. Thus, when the level begins to rise in zone 42 because some small change tends to allow the solvent to extract too much of the hydrocarbon feed, the liquid level controller will operate to cut back somewhat on the solvent feed rate by resetting the flow rate controller 25 to control at a somewhat lower rate. Conversely, if the liquid level in zone 42 begins to decrease, the liquid level controller will reset controller 25 to allow a somewhat higher rate of solvent feed to the extraction zone. Another advantage of this system is that it will be sensitive to change the rate of flow of solvent when there is a more or less permanent change in the system, but will be relatively insensitive to small momentary changes in the system and, thus, will not operate to readjust a well lined out unit unless a real and significant upset of the system has begun to occur. Moreover, the lag provided by the capacity of the accumulator and by characteristics of such a system of instruments prevents an upsetting sudden adjustment and eliminates a hunting action when the system does operate to make an adjustment.

When operating with a two-component solvent such as methyl Carbitol containing a small portion of water, stripper 32 is advantageously operated so that a portion of the water is distilled overhead, thus aiding in the stripping of the extracts from the solvent. In such case, the water settles in a separate phase in the lower portion of accumulator zone 42 and is desirably withdrawn through open valve 52 at a constant rate maintained by metering device 53 through line 51 into the bottom of stripper 32 and eventually emerges as part of the solvent flowing through line 33 from the bottom of the stripper. In any case, if there is a separate solvent component phase in zone 42, it is withdrawn through line 51, but if there is no solvent phase formed in zone 42, valve 52 is maintained closed.

Referring to Figure 2, there is illustrated an extraction zone which is in one section only and can be substituted for the two-section extraction zone of Figure 1 or Figure 3 or Figure 4. The plurality of feed lines indicate that the feed can be introduced at any intermediate point in the extraction zone. As will be understood, there is no longer a need for lines 4, 5, pump 6, liquid level controller 8, or control valve 7, there being a continuous solvent phase from near the top of the extraction zone all the way to the bottom of the extraction zone.

Figures 3 and 4 are fragmentary views of Figure 1 and each illustrates a different method of control of the solvent feed rate to the extraction zone in response to the rate of production of the concentrated extract stream flowing in line 40.

In Figure 3, it is seen that the liquid level controller connected with accumulator zone 42 controls the rate of flow of solvent in line 21 by directly controlling valve 23.

In Figure 4, it is noted that the rate of flow of solvent in line 21 to the extraction zone is directly controlled by the rate of production of concentrated extract flowing in line 40. Thus, valve 23 is controlled by flow rate controller 55 which is sensitive to the rate of flow of concentrated extract in line 40.

EXAMPLES

The apparatus represented in Figure 1 was utilized in the extraction of a 92.3 liquid volume percent cyclohexane feed containing as impurities methylcyclopentane, 2,2-dimethylpentane, 2,4-dimethylpentane, 3,3-dimethylpentane, 1,1-dimethylcyclohexane, 2,3-dimethylpentane, and 2-methylhexane. The results of 9 different runs are shown in Table 1. In each of these runs, the hydrocarbon feed was introduced in the top section 2 of the extractor through line 12, valves 11 and 15 being closed. The solvent employed in each case was methyl Carbitol containing from about 5 to about 7 volume percent water. During these runs, small upsets occurred in the extraction system conditions which caused the level in accumulator 42 to begin to rise or to lower. When this occurred, liquid level controller 50 automatically reset the solvent feed flow rate controller 25 to either slightly increase or slightly decrease the rate of flow of solvent. The flow rates of solvent feed in line 21 shown in the table are the average flow rates for the runs. From Table 1, it will be noted that very high purity cyclohexane products were obtained at reasonable extract reflux ratios, a result which would not have been possible without very close control of the reflux ratio in spite of small changes of conditions within the system.

Table 1

| Run No. | Hydrocarbon feed to extraction zone | | Solvent feed line 21 | | | Ratios [1] | | Extract hydrocarbon | | | | |
|---|---|---|---|---|---|---|---|---|---|---|---|---|
| | G. P. H. | Cyclohexane, LV percent | G. P. H. | Temperature, °F. | LV percent water | Reflux [4] | Flow [5] | Reflux line 45, G. P. H. | Product line 44, G. P. H. | Percent cyclohexane | | Concentration [3] |
| | | | | | | | | | | LV | Mol | |
| 1 | 1.20 | 92.3 | 44.0 | 102 | 6.1 | 6.00 | 8.50 | 6.0 | 1.00 | 99.2 | 99.5 | 0.159 |
| 2 | 1.31 | 92.3 | 45.0 | 102 | | 5.00 | 9.38 | 5.5 | 1.10 | 99.3 | 99.5 | 0.147 |
| 3 | 1.55 | 92.3 | 44.0 | 102 | | 4.23 | 9.23 | 5.5 | 1.30 | 99.3 | 99.5 | 0.154 |
| 4 | 1.80 | 92.3 | 52.3 | 102 | 6.6 | 4.00 | 9.98 | 6.0 | 1.50 | 99.0 | 99.4 | 0.143 |
| 5 | 1.80 | 92.3 | 56.0 | 102 | 7.1 | 3.69 | 11.40 | 5.5 | 1.49 | 98.3 | 98.9 | 0.125 |
| 6 | 1.80 | 92.3 | 66.9 | 101 | 6.5 | 3.97 | 12.40 | 6.0 | 1.51 | 98.5 | 99.1 | 0.112 |
| 7 | 2.20 | 92.3 | 68.5 | 101 | 6.8 | 3.97 | 10.70 | 7.2 | 1.81 | 98.4 | 99.0 | 0.132 |
| 8 | 2.61 | 92.3 | 66.6 | 101 | | 3.95 | 8.91 | 8.7 | 2.20 | 99.2 | 99.6 | 0.164 |
| 9 | 3.11 | 92.3 | 68.1 | 101 | 6.0 | 4.00 | 7.80 | 10.4 | 2.60 | 98.8 | 99.3 | 0.191 |

| Run No. | Raffinate product line 19 | | | | Raffinate recycle line 26, G.P.H. | Extractor | | | | Extract stripper 32 | | | | Stripper water line 51, G.P.H. |
|---|---|---|---|---|---|---|---|---|---|---|---|---|---|---|
| | Recovery LV percent [2] | G.P.H. | Cyclohexane, LV percent | Specific gravity, 20/4C | | Temperatures, °F. | | Pressures, p. s. i. g. | | Temperatures, °F. | | | Pressures, p. s. i. g. | |
| | | | | | | Upper column, top | Lower column, bottom | Upper column, top | Lower column, bottom | Top | Feed | Kettle | Top | Kettle | |
| 1 | 89.6 | 0.20 | 66.8 | 0.7456 | 5.7 | 95 | 91 | | 22.0 | 190 | 90 | 278 | 4.0 | 5.0 | 1.52 |
| 2 | 90.3 | 0.21 | 77.0 | 0.7559 | 5.7 | 95 | 89 | | 22.5 | 192 | 88 | 274 | 4.0 | 5.0 | 1.50 |
| 3 | 90.2 | 0.25 | 72.8 | 0.7514 | 5.7 | 96 | 90 | | 22.5 | 192 | 90 | 270 | 4.0 | 5.0 | 1.50 |
| 4 | 89.4 | 0.30 | 65.5 | 0.7441 | 7.0 | 96 | 87 | | 22.5 | 191 | 87 | 270 | 4.0 | 5.0 | 1.49 |
| 5 | 88.2 | 0.31 | 67.1 | 0.7458 | 7.0 | 95 | 88 | | 22.5 | 192 | 88 | 270 | 4.0 | 5.0 | 1.50 |
| 6 | 89.5 | 0.29 | 78.3 | 0.7572 | 8.7 | 95 | 85 | | 23.5 | 190 | 220 | 265 | 0.0 | 0.8 | 2.05 |
| 7 | 87.7 | 0.39 | 50.1 | 0.7287 | 8.7 | 95 | 86 | | 23.2 | 190 | 210 | 269 | 0.0 | 1.0 | 3.00 |
| 8 | 90.6 | 0.41 | 56.0 | 0.7345 | 8.7 | 94 | 88 | 14.0 | 23.0 | 190 | 200 | 271 | 0.0 | 1.0 | 3.07 |
| 9 | 89.5 | 0.51 | 54.6 | 0.7332 | 9.1 | 95 | 89 | 14.0 | 23.0 | 192 | 200 | 275 | 0.2 | 1.2 | 3.94 |

[1] At bottom of extractor section 3.
[2] Recovery of cyclohexane contained in the feed as extract product.
[3] Concentration of extract hydrocarbon in solvent at bottom of extraction zone 3 expressed as gallons of hydrocarbon per gallon of solvent.
[4] Reflux to extract product.
[5] Solvent-extract mixture to reflux.

Specific embodiments of the invention have been described in connection with a solvent which has a density greater than the feed, but the invention is equally applicable to solvents having a density less than the feed. In such cases, the extract and solvent is removed from the top of the extraction zone. The solvent and extract streams may be separated by means other than fractionation. If fractionation is used, the solvent may be lower boiling than the feed and thus be removed overhead in the extract stripper. When using a solvent having a density greater than the feed, the interface in the extraction zone is usually maintained near the top but may be maintained near the bottom, if desired.

As will be evident to those skilled in the art, various modifications of this invention can be made or followed in the light of the foregoing disclosure and discussion without departing from the spirit or scope of the disclosure or from the scope of the claims.

We claim:

1. An arrangement of apparatus for effecting and controlling a solvent extraction process, which comprises an extraction column; a feed line leading into an intermediate portion of said column and having means for controlling the rate of flow therein; a solvent feed line leading into an upper portion of said column; a raffinate line leading from the uppermost portion of said column; a solvent-extract line leading from the lowermost portion of the said column; means in said solvent-extract line for separating solvent-extract into a solvent stream in a solvent effluent line and an extract stream in an extract effluent line, said extract effluent line leading into an extract accumulator vessel; an extract line leading from said accumulator vessel and branching into an extract product line and an extract recycle line for passing extract as recycle to a lower portion of said extraction column; means for positive control of the rate of flow in said extract product line at a substantially constant rate; means for positive control of the rate of flow in said extract recycle line at a substantially constant rate; and means for controlling the rate of flow in said solvent feed line in response to the rate of flow in said extract effluent line.

2. An arrangement of apparatus according to claim 1 wherein the said means for controlling the rate of flow in said solvent feed line comprises a control valve in said solvent feed line responsive to a flow rate controller sensitive to the rate of flow in said extract effluent line.

3. An arrangement of apparatus according to claim 1 wherein the said means for controlling the rate of flow in said solvent feed line comprises a control valve in said solvent feed line responsive to a liquid level controller operatively connected to said accumulator vessel, said level in said accumulator being dependent upon the rate of flow of extract in said extract effluent line.

4. An arrangement of apparatus according to claim 1 wherein the said means for controlling the rate of flow in said solvent feed line comprises a control valve in said solvent feed line responsive to a flow rate controller which is reset by a liquid level controller operatively connected with said accumulator vessel, said liquid level being dependent upon the rate of flow of extract in said extract effluent line.

5. An arrangement of apparatus according to claim 1 wherein said extraction column is in two sections which are operable in series, an upstream and a downstream section; a conduit connects the bottom of the upstream section with the top of the downstream section, said conduit being adapted to convey extract solvent phase from the upstream section to the downstream section, another conduit connects the top of the downstream section with the bottom of the upstream section, said conduit being adapted to convey raffinate from said downstream section to said upstream section; and a second interface level controller connected to the top of the downstream section is operatively connected with a valve in said another conduit.

6. An arrangement of apparatus according to claim 1 wherein a pressure control means responsive to the pressure at a point in the lower portion of said column is operatively connected to a valve in said solvent-extract line so as to maintain a substantially constant back-pressure on said extraction column.

7. An arrangement of apparatus according to claim 1 wherein the top of said column is connected with an interface level controller which is operatively connected with a valve in said raffinate effluent line.

8. An arrangement of apparatus according to claim 1 wherein there is provided a conduit connected to the top portion of said column which is adapted to conduct into said column as recycle a portion of said raffinate which flows in said raffinate line leading from the uppermost portion of the column.

9. A process which comprises passing a feed stream including a plurality of liquid components into an intermediate portion of a solvent extraction zone; passing a stream comprising a selective solvent for at least one of the components of the feed into an upper portion of the extraction zone so as to effect commingling of the feed and solvent and extraction of at least one of the feed components to form a solvent-extract phase and a raffinate phase and establish an interface between the phases in the upper portion of the extraction zone; recovering a raffinate stream from the uppermost portion of the extraction zone; recovering a solvent-extract stream from a lowermost portion of the extraction zone; separating the solvent-extract stream into a solvent effluent stream and a concentrated extract stream; controlling the operation of the extraction zone and the concentration of the desired component or components in the concentrated extract stream by the steps comprising: dividing the concentrated extract stream into an extract product stream and an extract stream which is recycled to the lowermost portion of the extraction zone, and maintaining a substantially constant rate of flow of each of these two streams; maintaining a substantially constant rate of flow of said feed stream; and controlling the rate of flow of said stream comprising a selective solvent passed to said extraction zone in response to the rate of production of said concentrated extract stream.

10. A process which comprises passing a feed stream including a plurality of liquid components into an intermediate portion of a solvent extraction zone; passing a stream comprising a selective solvent for at least one of the components of the feed into an upper portion of the extraction zone so as to effect commingling of the feed and solvent and extraction of at least one of the feed components to form a solvent-extract phase and a raffinate phase and establish an interface between the phases in the upper portion of the extraction zone; recovering a raffinate stream from the uppermost portion of the extraction zone; recovering a solvent-extract stream from a lowermost portion of the extraction zone; separating the solvent-extract stream into a solvent effluent stream and a concentrated extract stream; controlling the operation of the extraction zone and the concentration of the desired component or components in the concentrated extract stream by the steps comprising: dividing the concentrated extract stream into an extract product sream and an extract stream which is recycled to the lowermost portion of the extraction zone, and maintaining a substantially constant rate of flow of each of these two streams; maintaing a substantially constant rate of flow of said feed stream; and directly controlling the rate of flow of said stream comprising a selective solvent passed to said extraction zone in response to the rate of flow of said concentrated extract stream.

11. A process which comprises passing a feed stream including a plurality of liquid components into an intermediate portion of a liquid-liquid solvent extraction zone; passing a stream comprising a selective solvent for at least one of the components of the feed into an upper portion of the extraction zone so as to effect commingling of the feed and solvent and extraction of at least one of the feed components to form a solvent-extract phase and a raffinate phase and establish an interface between the phases in the extraction zone; recovering a raffinate stream from the uppermost portion of the extraction zone; recovering a solvent extract stream from the lowermost portion of the extraction zone; separating solvent-extract stream into a solvent effluent stream and a concentrated extract stream; collecting the concentrated extract in an accumulation zone; and controlling the operation of the extraction zone and the concentration of the desired component or components of the concentrated extract stream by the steps comprising: dividing the concentrated extract stream from the accumulation zone into an extract product stream and an extract stream which is recycled to the lowermost portion of the extraction zone, and maintaining a substantially constant rate of flow of each of these two streams; maintaining a substantially constant rate of flow of said feed stream; and directly controlling the rate of flow of said stream comprising a selective solvent passed to said extraction zone in response to the liquid level in said accumulation zone, said level being dependent upon the rate of flow of said concentrated extract stream.

12. A process which comprises passing a feed stream including a plurality of liquid components into an intermediate portion of a liquid-liquid solvent extraction zone; passing a stream comprising a selective solvent for at least one of the components of the feed into an upper portion of the extraction zone so as to effect commingling of the feed and solvent and extraction of at least one of the feed components to form a solvent-extract phase and a raffinate phase and establish an interface between the phases in the extraction zone; recovering a raffinate stream from the uppermost portion of the extraction zone; recovering a solvent-extract stream from the lowermost portion of the extraction zone; separating the solvent-extract stream into a solvent effluent stream and a concentrated extract stream; collecting the concentrated extract in an accumulation zone; and controlling the operation of the extraction zone and the concentration of the desired component or components in the concentrated extract stream by the steps comprising: dividing the concentrated extract stream from the accumulation zone into an extract product stream and an extract stream which is recycled to the lowermost portion of the extraction zone; and maintaining a substantially constant rate of flow of each of these two streams; maintaining a substantially constant rate of flow of said feed stream; maintaining the solvent passed to the said upper portion of the extraction zone under rate of flow control, which rate of flow control is reset in response to change in liquid level in said accumulation zone, said liquid level being responsive to the rate of flow of said concentrated extract stream.

13. The process of claim 9 wherein the said raffinate stream is withdrawn from an uppermost portion of said extraction zone at such a rate as to maintain the interface level in the upper portion of the extraction zone substantially constant.

14. The process of claim 9 wherein the said solvent-extract stream is withdrawn from said extraction zone at such a rate as to maintain a predetermined pressure at a point in a lower portion of the extraction zone.

15. The process of claim 13 wherein a portion of said raffinate stream withdrawn from an uppermost portion of said extraction zone is recycled to the upper portion of said extraction zone at a substantially constant rate of flow.

16. The process of claim 9 wherein the step of separating the solvent-extract stream into a solvent effluent stream and a concentrated extract stream is effected by fractional distillation.

References Cited in the file of this patent

UNITED STATES PATENTS

| | | |
|---|---|---|
| 2,192,094 | Moore | Feb. 27, 1940 |
| 2,299,426 | Rosebaugh | Oct. 20, 1942 |
| 2,652,439 | Neuhart et al. | Sept. 15, 1953 |